United States Patent
Katare et al.

(10) Patent No.: US 11,339,703 B2
(45) Date of Patent: May 24, 2022

(54) ENGINE EMISSION PREDICTION SYSTEM

(71) Applicant: Ford Global Technologies, LLC, Dearborn, MI (US)

(72) Inventors: Santhoji Katare, Chennai/Tamil Nadu (IN); John Joseph Virga, Farmington Hills, MI (US); John Paul Bogema, Flat Rock, MI (US); Mohamed Asper, Chennai/Tamil Nadu (IN); Vamsee Krishna Batchu, Chennai/Tamil Nadu (IN); Chandar Mathalai, Chennai/Tamil Nadu (IN); Farshad Harirchi, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/074,677

(22) Filed: Oct. 20, 2020

(65) Prior Publication Data
US 2021/0123370 A1    Apr. 29, 2021

(30) Foreign Application Priority Data
Oct. 23, 2019 (IN) .............................. 201941043161

(51) Int. Cl.
  *F01N 11/00* (2006.01)
  *G07C 5/00* (2006.01)
  (Continued)

(52) U.S. Cl.
  CPC .......... *F01N 11/007* (2013.01); *F01N 11/002* (2013.01); *F02D 41/26* (2013.01);
  (Continued)

(58) Field of Classification Search
  CPC .. F01N 11/007; F01N 11/002; F01N 2550/05; F01N 2900/10; F01N 2900/14;
  (Continued)

(56) References Cited

U.S. PATENT DOCUMENTS 10,774,722 B2 * 9/2020 Shao .................... B01D 46/442
10,795,349 B2 * 10/2020 Schultalbers ....... G06F 11/3672
(Continued)

FOREIGN PATENT DOCUMENTS

CN      106353105 B       9/2018

OTHER PUBLICATIONS

"A Step-By-Step Methodology for Vehicle Testing to Catch Defeat Devices", ICCT, Jun. 2019; www.THEICCT.org.
(Continued)

*Primary Examiner* — George C Jin
(74) *Attorney, Agent, or Firm* — Brandon Hicks; Bejin Bieneman PLC

(57) ABSTRACT

Approaches for predicting parameters contributing to engine emissions are described. In an example, the values of control parameters may be obtained from the vehicle sensors. Based on the obtained values of the control parameters, estimated emission value may be determined pertaining to a correlation criterion reflecting a predetermined relationship between the obtained control parameter and engine emission. Further, the contribution index of each of the individual control parameters may be identified. Further, based on the estimated emission value and the contribution index, aggregated emission value corresponding to the exhausted emission from the engine for particular trip may be calculated.

18 Claims, 3 Drawing Sheets

(51) Int. Cl.
*G07C 5/08* (2006.01)
*F02D 41/26* (2006.01)

(52) U.S. Cl.
CPC ........... *G07C 5/004* (2013.01); *G07C 5/0808* (2013.01); *G07C 5/0825* (2013.01); *F01N 2550/05* (2013.01); *F02D 2200/021* (2013.01); *F02D 2200/0406* (2013.01); *F02D 2200/0414* (2013.01); *F02D 2200/0802* (2013.01); *F02D 2200/101* (2013.01); *F02D 2200/501* (2013.01); *F02D 2200/602* (2013.01)

(58) Field of Classification Search
CPC ..... F01N 2900/08; F01N 9/005; G07C 5/004; G07C 5/0808; G07C 5/0825; F02D 41/26; F02D 41/22; F02D 41/1401; F02D 41/1462; F02D 2200/0801; F02D 2200/101; F02D 2200/0406; F02D 2200/501; F02D 2200/0414; F02D 2200/602; F02D 2200/021; F02D 2041/1433
See application file for complete search history.

(56) References Cited

U.S. PATENT DOCUMENTS

| | | | |
|---|---|---|---|
| 2003/0216855 A1* | 11/2003 | Liang | F02D 41/1462 |
| | | | 701/114 |
| 2013/0024066 A1* | 1/2013 | Geilen | F02D 41/266 |
| | | | 701/29.6 |
| 2015/0168260 A1* | 6/2015 | Adams | F01N 3/2033 |
| | | | 60/274 |
| 2017/0103591 A1 | 4/2017 | Ramberg | |
| 2017/0167349 A1* | 6/2017 | Balram | B01D 53/9431 |
| 2018/0171922 A1 | 6/2018 | Noh | |

OTHER PUBLICATIONS

Contag et al., "How They Did It: An Analysis of Emission Defeat Devices in Modern Automobiles", European Research Council (ERC) under the European Union's Horizon 2020 research and innovation programme (grant agreement No. 640110—BASTION). This work was funded in part by the National Science Foundation through grant NSF-1646493.
"Defeat device", Wikipedia, https://en.wikipedia.org/wiki/Defeat_device.

* cited by examiner

… (US 11,339,703 B2)

ENGINE EMISSION PREDICTION SYSTEM

BACKGROUND

This patent application claims priority to Indian Patent Application No. IN201941043161, filed Oct. 23, 2019, which is hereby incorporated herein by reference in its entirety.

Vehicles have become an essential requirement for private individuals as well as commercial purposes. Tremendous increase in the number of vehicles has resulted in a corresponding increase in overall emissions that may be emitted into the environment. Examples of emissions include, but are not limited to, carbon monoxide, oxides of nitrogen (NOx), hydrocarbons, sulphur dioxide, and carbon dioxide. Owing to such emissions and driven by the need to ensure that the impact on the environment is minimal, various statutory environmental agencies require that vehicles conform to one or more emissions norms. In order to establish that the vehicle under consideration conforms with the emissions norms, the vehicle may be subject to periodic tests.

As would be generally understood, the rate of emission by any vehicle may change or vary over different instances of time. For example, in lab conditions the rate or volume of emissions produced by the vehicle may be different from the rate and volume of emissions that may be produced during on-road operations. Furthermore, it has also been determined that a number of other factors may also influence the emissions. Such factors may be induced deliberately through use of mechanisms such as defeat devices. Defeat devices may be considered as mechanisms which reduce the effect of factors affecting emissions during normal driving conditions, and consequently producing lower emissions. Since such conditions may not be replicable under lab conditions, an appropriate emission behavior of the vehicle may either not be tested or may not be accurately assessed. In certain other cases, owing to the increasing complexity in the machinery and the control systems of the vehicles, certain features may also unintentionally perturb the rate of emission. However, if the same is detected by environmental agencies, it may lead to the agencies imposing fines on the vehicle manufacturer.

BRIEF DESCRIPTION OF THE DRAWINGS

The following detailed description references the drawings, wherein.

Figure 1:
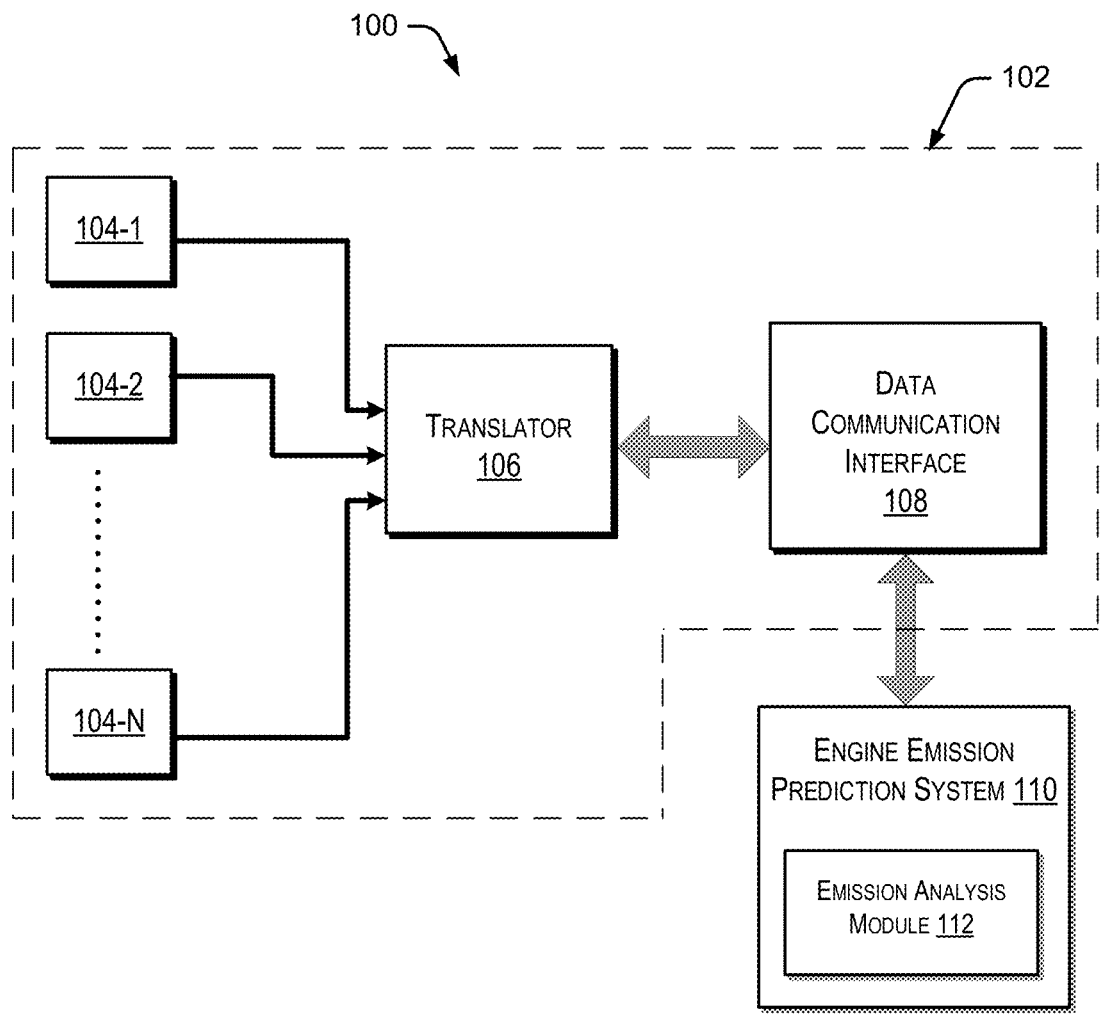
FIG. 1 is a block diagram of an exemplary system for predicting engine emission parameters, as per an implementation of the present subject matter.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Vehicles have become an essential requirement for private individuals as well as for commercial purposes. Development and urbanization over the past years has led to a tremendous increase in the number of vehicles. Further, increase in the number of vehicles has resulted in an increase in pollutants emitted by these vehicles. Examples of pollutants emitted by these vehicles include carbon monoxide (CO), oxides of nitrogen (NOx), hydrocarbons, sulphur dioxide ($SO_2$), and carbon dioxide ($CO_2$). The pollutants emitted by the vehicles have damaging effects on both humans and ecology. Without timely and effective measures to mitigate the problems associated with the emission of pollutants, the human health and the ecology may continue to deteriorate.

In an effort to control the level of pollutant emission, government agencies of many countries have adopted emission control strategies and policies, such as implementation of more stringent emission norms for vehicles. For instance, the vehicle may have to conform with the emission standards right from manufacturing and during the course of its operation when the vehicle is being driven. As would be understood, the surrounding conditions may also vary which in turn may have an impact on the emissions by the vehicle under consideration. Furthermore, the rate and volume of emissions may also change with time and may vary with how the vehicle itself is being operated.

Returning to the emissions testing, the testing may be performed in conditions which differ substantially from normal driving conditions. Furthermore, presence of defeat devices may also result in conditions during normal driving operation which may degrade emission performance. Since it is possible that such conditions cannot be replicated during the testing, it may not be possible to detect either the presence of a defeat device, nor detect any influence of a bonafide feature in the vehicle on the emission performance of the vehicle (which may be considered as a defeat device under certain regulatory provisions).

To this end, approaches for estimating a contribution of one or more control parameters to emissions of a vehicle during operation are described. As per an implementation of the present subject matter, examples of control parameters include, but are not limited to, engine operational parameters, driving parameters, and vehicle operating parameters. It may be noted that other such parameters may also be included within the scope of the present subject matter. Returning to the present example, the control parameters are correlated with a correlation criterion. In an example, the correlation criteria may be considered as providing a correlation between the different control parameters and the extent of the emissions from the vehicle. In another example, the correlation criteria may also be utilized to indicate the contribution that any one of the control parameters has on the emissions from the vehicle.

With the correlation criterion in place, one or more control parameters from sensors of a vehicle may be obtained. Depending on the control parameters which are detected using the sensors, an estimated emission may be determined based on the correlation criterion. As mentioned previously, the correlation criterion provides a correlation between vehicle emissions and the appropriate control parameters. Thereafter, an extent of the contribution of a control parameter under consideration may be determined by determining a change in the estimated value on considering and not considering a control parameter. The control parameters which may be contributing most to the vehicle emissions may then be ranked based on their impact on the vehicle emissions. In an example, the control parameters may be categorized as one of a high impact control parameter and a low impact control parameter based on their contribution to the vehicle emissions. Once the extent of contribution of the control parameters is determined, an aggregate emission value for a particular trip may be calculated based on the estimated emission values for the control parameters found to have a greatest contribution to the vehicle emissions.

In an example, the correlation criteria may be derived using a neural network-based system reflecting a predetermined relationship between the control parameters and the corresponding values of engine emissions based on historical vehicle operating data, e.g., associated with a plurality of engines, wherein each of the engines are of a same specification. The specification associated with the engine can be one or more of fuel type, injection timing, compression ratio, turbocharger efficiency, after-cooler characteristics, ideal operating temperature range, operating pressure range, operating fuel rates, and engine speed. Further, the contribution index of each control parameter to the accuracy of the correlation criteria may be identified, by analyzing the amount of change in the predicted emission value with and without the inclusion of the control parameter.

The above examples may be implemented in one or more processor-based or other logic devices or systems. Such systems may either be integrated within the vehicle or may be implemented as standalone systems. Such standalone systems may be subsequently interfaced with the vehicle to receive control parameters' values, calculate aggregated emission value, display the calculated value on a display device, and compare the calculated aggregated emission value with a predefined aggregated emission threshold value.

In one implementation, the engine emission prediction system may be implemented as a standalone system on a computing device, accessible by the user. In another implementation, the calculated aggregated emission value may be provided to the engine emission prediction system, implemented on a web-based portal over cloud-based computing. In yet another implementation, the calculated aggregated emission value may be displayed on a display device, and then, subsequently compared with a predefined threshold emission value. Further, based on logical comparison, a modification may be done on the vehicular system.

The above-mentioned implementations are further described herein with reference to the accompanying figures. It should be noted that the description and figures relate to exemplary implementations and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIG. 1 is a block diagram of an environment 100 comprising a system 102. The system 102, in an example, may include a vehicle, an automobile, or any other apparatus or machine comprising an internal combustion engine which may generate emissions during the course of its operation. The system 102 includes a plurality of sensors 104-1, 104-2, . . . , 104-N (collectively referred to as sensor(s) 104), a translator 106, and a data communication interface 108. The system 102 may further be coupled to an engine emission prediction system 110. The engine emission prediction system 110 may either be integrated within the system 102, or in some other cases, may be capable of connecting with the system 102 through a wired or a wireless interface, implemented through the data communication interface 108.

Each of the plurality of sensor(s) 104 may be used to determine control parameters corresponding to engine operational parameters, vehicle operating parameters, and driving parameters. During the operation of the system 102, each of the sensor(s) 104 may sense and monitor the value of the corresponding control parameter in real-time. It may be noted that each of the sensor(s) 104 may be specifically adapted such that they may monitor the appropriate control parameters. For example, an RPM sensor would be adapted to monitor and measure the engine speed (which is one example of the vehicle operating parameters). In a similar manner, a pedal sensor may detect the number of time and with what intensity the brake pedal or the accelerator pedal has been pressed (which is one example of the driving parameters). As would be understood, each of the sensor(s) may monitor and detect the corresponding control parameters.

A few of the illustrative examples of one or more control parameters corresponding to vehicle operating parameters include, but are not limited to, vehicle speed, vehicle acceleration, braking force, engine speed, engine load, engine fuel consumption, intake manifold pressure, intake manifold temperature, NOx sensor reading, injection pressure, engine coolant temperature, exhaust flow rate, engine NOx output, catalyst inlet temperature, and catalyst temperature. One of the control parameters may also correspond to driving parameters, examples of which include, accelerator pedal position, brake pedal position, number of clutch actuations, and gear shift frequency. Examples of engine operational parameters in turn include engine temperature, exhaust flow rate, engine out-NOx, SCR related temperature, urea dosage, etc. It may be noted that the present examples are only indicative and other examples may also be possible without deviating from the scope of the present subject matter.

The sensor(s) 104 may be further coupled to the engine emission prediction system 110 through the translator 106 and the data communication interface 108 as illustrated in the FIG. 1. The translator 106 may translate the signals produced as a result of the sensed conditions of control parameters by the sensor(s) 104 into a computer-processable format which is processable by the engine emission prediction system 110. For example, the translator 106 translates the engine speed into revolutions per minute (rpm) into corresponding signals which when received by the engine emission prediction system 110 may be processed to determine the value of engine speed.

The data communication interface 108 (herein referred to as interface 108), provides a mechanism for receiving the values of control parameters from each of the sensor(s) 104 through the translator 106. The interface 108 also provides a mechanism for communicating such values indicative of the control parameters to the engine emission prediction system 110. The interface 108 may be one of a wired interface and a wireless interface, for communicatively associating the sensor(s) 104 with the engine emission prediction system 110. Examples of the interface 108 include, but are not limited to, Bluetooth, USB, Wi-Fi, Radio Frequency (RF) signals, On-Board Diagnostic (OBD) based interfaces, Assembly Line Diagnostic Link (ALDL) based interfaces, and OpenXC based vehicle interfaces which allow consumer devices, such as smart phones, to access the emission data from the vehicle. The interface 108 facilitates the communication between the sensor(s) 104 and the engine emission prediction system 110.

In one example, the engine emission prediction system 110 may be implemented as a processor-based computing system. Further, the system 102 may be integrated within the vehicle under consideration or may be such that it may be coupled to the system 102. The engine emission prediction system 110 may be capable of establishing communication with the interface 108 for exchanging data, such as control parameters values (also referred to as emission data).

The engine emission prediction system 110 on receiving the emission data through the interface 108, may process the data to generate an aggregated emission value. The aggregated emission value may indicate the level of emitted pollutants by the vehicle's engine through the tail pipe, during on-road operation of the vehicle. The engine emission prediction system 110 includes an emission analysis module 112 for processing the control parameters values to render the aggregated emission value.

In operation, when the vehicle is in operation mode, i.e., the vehicle is running on-road, at least one sensor(s) 104 may measure one or more control parameters of the system 102, such as a vehicle. The translator 106 may obtain data indicating the levels of the control parameters from the sensor(s) 104. The translator 106 may further translate the values of the sensed control parameters into a computer-processable format to obtain emission data. The values of emission data are further provided to the interface 108. The interface 108 further communicates the emission data values to the engine emission prediction system 110. The control parameters, or the emission data may be stored in a repository (not shown in FIG. 1) within the engine emission prediction system 110.

According to one implementation, upon receiving the emission data, the emission analysis module 112 of the engine emission prediction system 110 may calculate an aggregated emission value, based on estimated emission values and a contribution index. Thereafter, the emission analysis module 112 may display the aggregated emission value on a display device (not shown in FIG. 1). In one example, the display device may be an internal display device on the dashboard of the vehicle. In another example, the display device may be an external display device on the body of the vehicle.

According to another implementation, the calculated aggregated emission value, corresponding to the level of emitted pollutants by the vehicle's engine, may be compared with a predefined aggregated emission value. A predefined aggregated emission threshold value is indicative of a permissible amount of an emission level of the pollutant released from the vehicle. Further, the emission analysis module 112 may perform a particular function based on the comparison. As mentioned previously, the system 102 as depicted in FIG. 1 may be implemented within the vehicle under consideration. In such a case, the engine emission prediction system 110 may be implemented within an onboard-computing system of the vehicle.

Figure 2:
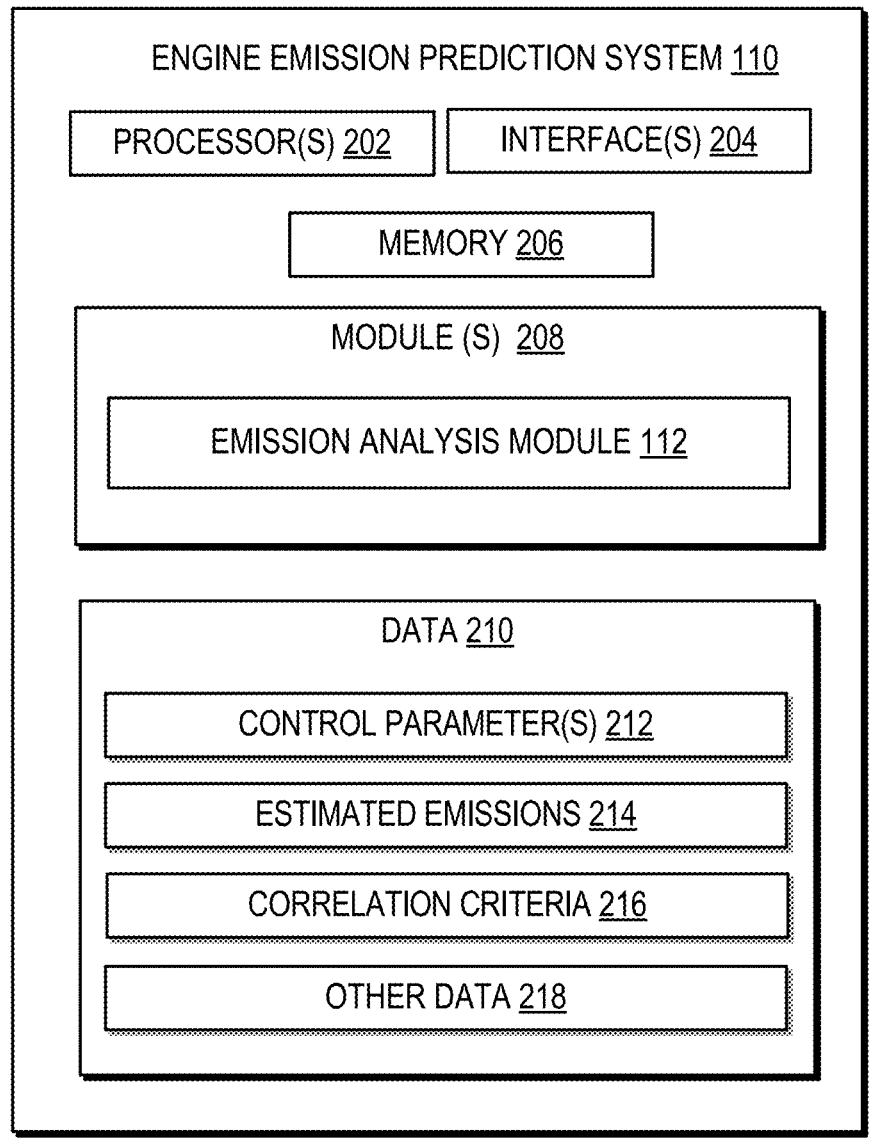
FIG. 2 is a block diagram of an engine emission prediction system, as per an implementation of the present subject matter.

FIG. 2 is a block diagram of the engine emission prediction system 110, as per an implementation of the present subject matter. The engine emission prediction system 110 may be a computing device which may be deployed in a vehicle. Examples of the engine emission prediction system 110 include laptops, desktops, tablets, or any other forms of hand-held computing devices, such as mobile phones. Continuing with the present implementation, the engine emission prediction system 110 may further include a processor(s) 202, an interface(s) 204, and a memory 206. The processor(s) 202 may also be implemented as signal processor(s), state machine(s), logic circuitries, and/or any other device or component that manipulate signals based on operational instructions.

The interface(s) 204 may include a variety of interfaces, for example, interface for data input and output devices, referred to as I/O devices, storage devices, network devices, and the like, for communicatively associating the engine emission prediction system 110 with interface 108 of the vehicle (not shown in FIG. 2). The memory 206 may store one or more computer-readable instructions. The memory 206 may include any nontransitory computer-readable medium including, for example, volatile memory such as RAM, or non-volatile memory such as EPROM, flash memory, and the like.

The engine emission prediction system 110 may further include module(s) 208 and data 210. The module(s) 208 may be implemented as a combination of hardware and programming logic (e.g., programmable instructions) to implement one or more functionalities of the module(s) 208. In one example, the module(s) 208 include the emission analysis module 112 for determining the aggregated emission value. The data 210 on the other hand includes control parameter(s) 212, estimated emissions 214, correlation criteria 216, and other data 218. Further, the other data 218, amongst other things, may serve as a repository for storing data that is processed, received, or generated as a result of the execution of one or more modules in the module(s).

In examples described herein, such combinations of hardware and programming may be implemented in a number of different ways. For example, the programming for the module(s) 208 may be processor-executable instructions stored on a nontransitory machine-readable storage medium and the hardware for the module(s) 208 may include a processing resource (e.g., one or more processors), to execute such instructions. In the present examples, the machine-readable storage medium may store instructions that, when executed by the processing resource, implement module(s) 208 or their associated functionalities.

In operation, the sensor(s) 104 may detect and measure one or more control parameters of a vehicle (i.e., the system 102). In an example, the control parameters may be stored as control parameter(s) 212. Depending on the control parameter(s) 212 which are detected using the sensor(s) 104, an estimated emission may be determined. The emissions estimates may in turn be stored as estimated emissions 214 within the engine emission prediction system 110. In an example, the estimated emissions 214 may be determined based on correlation criteria 216. Amongst other things, the correlation criteria 216 may define correlations between various levels of emissions and certain control parameter(s) 212 that may be detected under circumstances which may otherwise appear to be uncorrelated or not of relevance for purposes of emissions. As mentioned previously, certain factors may unduly impact the emissions of a vehicle. For example, the engine may usually have high emissions in low-temperature conditions (for example, at the time of starting the engine up in cold weather). The engine emissions may also be high in circumstances when the vehicle is being operated under heavy stress conditions, such as during pulling of heavy loads (which in turn may result in high engine speeds for unusually long periods of time). In a similar manner, other factors may also influence emissions from a vehicle.

Returning to the present example, the emission analysis module 112 may determine the estimated emissions 214 based on the detected control parameter(s) 212 and the correlation criteria 216. Once the estimated emissions 214 are determined, the emission analysis module 112 may further determine a contribution of the pertinent control parameter(s) 212 under consideration to the emissions of the system 102. In an example, the emission analysis module 112 may initially determine a first value of estimated emissions 214 by considering one of the control parameters, referred to as a baseline control parameter, within the control parameter(s) 212. Thereafter, the emission analysis module 112 may further determine a second value of estimated emissions 214 by not considering the baseline control parameter. Once determined, the first value and the second value of the estimated emissions 214 are compared by the emission analysis module 112. If the difference between the first value and the second value is beyond a predefined threshold, the baseline control parameter may be considered as a relevant contributor to the emissions. If the difference is less than the predefined threshold, the baseline control parameter may be considered as not relevant for the emissions. In this manner all parameters within the control parameter(s) 212 may be assessed to determine whether any given baseline control parameter is relevant or not for the purposes of the emissions.

Once the relevant baseline control parameters are identified, the same may be ranked based on the extent of impact that such a parameter may cause on the emissions. For example, the estimated emissions 214 may rank the relevant baseline control parameters based on the difference between the corresponding first value and the second value, in a decreasing order. In such a case, the relevant baseline control parameter which appear higher in the ordered list may be considered as more relevant and likely to have more impact on the emissions of the vehicle, such as the system 102.

In another example, the emission analysis module 112 may also categorize relevant baseline control parameter as one of a high-impact control parameter and a low-impact control parameter. Once the extent of contribution of the relevant one or more parameters within the control parameter(s) 212 is determined, an aggregate emission value for a particular trip may be calculated based on the estimated emission values for the control parameter(s) 212 found to have a greatest contribution to the vehicle emissions. Thereafter, the emission analysis module 112 may determine aggregated emission estimates based on the relevant control parameter(s) 212 and based on the extent of their contribution to the emissions.

In an example, the correlation criteria 216 may be implemented through a variety of databases built on the basis of vehicular historical data, physics-based models, or a combination of such models. In an example, the aggregate emissions may be used for classifying the vehicle, i.e., the system 102, and accordingly establish a reward-penalty based systems. For example, a vehicle found to have low aggregate emissions may be awarded with carbon credits or a reduction in vehicle related levies or fees. In the event that the vehicle is found to have high aggregate emissions, one or more penalties in the form of taxes or higher toll may be imposed on the owner of the vehicle. This may encourage the vehicle owner to take corrective action to reduce the aggregate emissions. In another example, the vehicle may be associated with certain other indications to assist authorities in identifying that the vehicle may be resulting in higher aggregated emissions than what may be permitted.

In yet another example, the indication corresponding to the aggregate emissions may be displayed by the emission analysis module on a display device (not shown in FIG. 2) which may be associated with the owner of the vehicle. In one example, the display device may be an internal display device on the dashboard of the vehicle. In another example, the display device may be an external display device on the body of the vehicle.

As would be gathered from the above description, the aggregated emission value corresponding to the emission level of the vehicle, along with the contributing parameters are measured in real-time when the vehicle is in running mode. However, it should be noted that, the present subject matter may be implemented on any system generating pollutants, either in stationary or running conditions, without deviating from the scope of the present subject matter. Examples of such systems may include but are not limited to machines in power plants.

Figure 3:
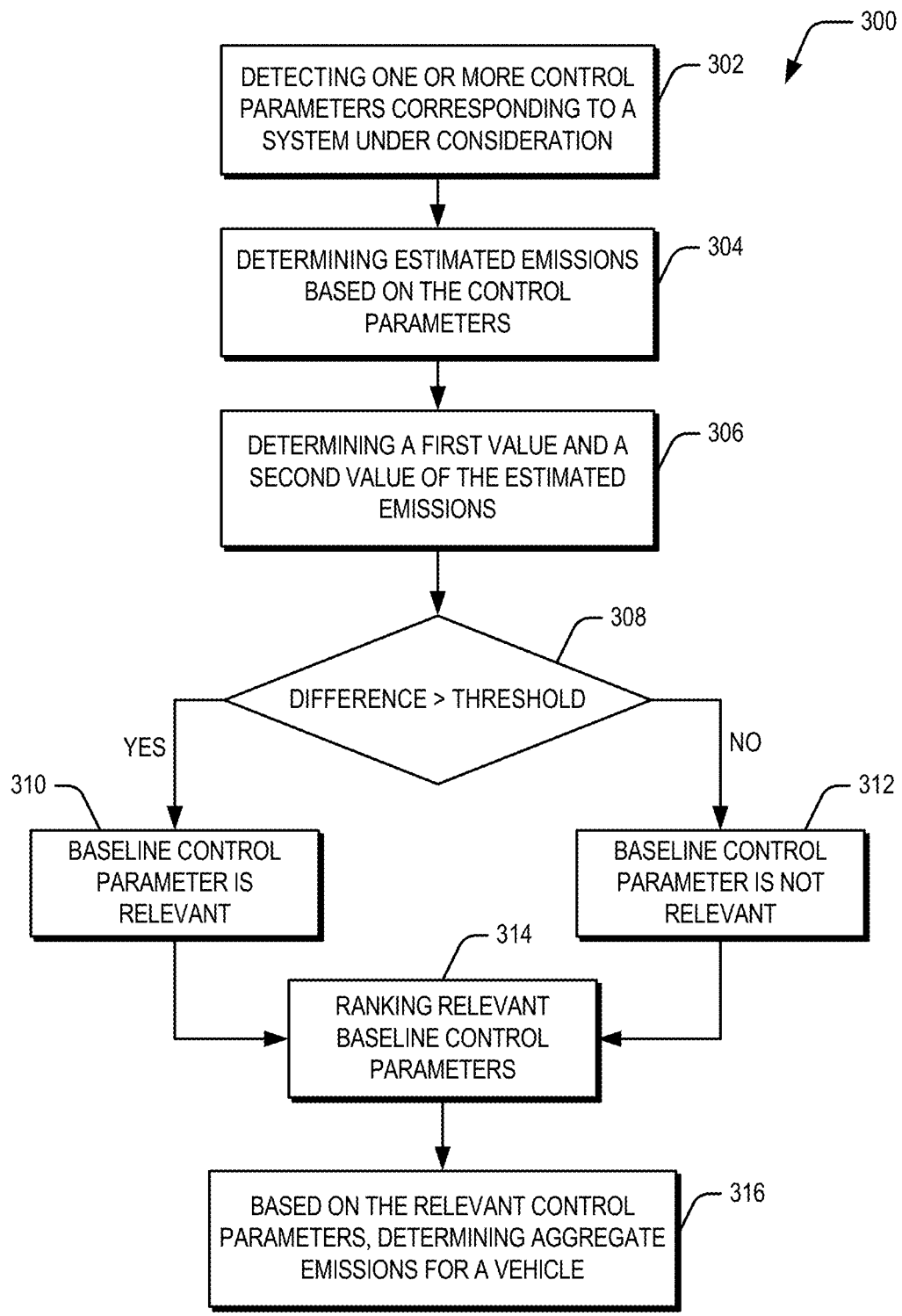
FIG. 3 is a flowchart of a method for predicting engine emission parameters, as per an implementation of the present subject matter.

FIG. 3 is a flowchart of a method 300 for predicting engine emission parameters for a vehicle in real-time, as per an implementation of the present subject matter. The order in which the method 300 is described is not intended to be construed as a limitation, and any number of the described method blocks may be combined in any order to implement the aforementioned method, or an alternative method. Furthermore, method 300 may be implemented by processing resource or computing device(s) through any suitable hardware, nontransitory machine-readable instructions, or combination thereof.

It may also be understood that method 300 may be performed by programmed computing devices, such as engine emission system 110 as depicted in FIG. 1 or 2. Furthermore, the method 300 may be executed based on instructions stored in nontransitory computer-readable medium, as will be readily understood. The nontransitory computer-readable medium may include, for example, digital memories, magnetic storage media, such as one or more magnetic disks and magnetic tapes, hard drives, or optically readable digital data storage media. Although the method 300 is described below with reference to the engine emission system 110 as described above, other suitable systems for the execution of these methods can also be utilized. Additionally, implementation of this method is not limited to such examples.

At block 302, one or more control parameters corresponding to a system under consideration may be detected. For example, the sensor(s) 104 of the system 102 may detect and measure one or more control parameter(s) 212. In an example, the control parameter(s) 212 may be considered as any parameter which characterizes engine operational parameters, vehicle operating parameters, driving parameters, or a combination of such parameters.

At block 304, estimated emissions based on the control parameters may be determined. For example, the emission analysis module 112 may determine estimated emissions 214 based on the control parameter(s) 212. In an example, the estimated emissions 214 may be determined based on correlation criteria 216. Amongst other things, the correlation criteria 216 may define a correlation between various levels of emissions and certain control parameter(s) 212 that may be detected under circumstances which may otherwise appear to be uncorrelated or not of relevance for purposes of emissions.

At block 306, a contribution of the pertinent control parameters to the emissions may be determined. To this end a first value and a second value of the estimated emissions may be determined. For example, the emission analysis module 112 may further determine a contribution of the pertinent control parameter(s) 212 under consideration to the emissions of the system 102. In an example, the emission analysis module 112 may initially determine a first value of estimated emissions 214 by considering a baseline control parameter, wherein the baseline control parameter is one of the control parameter(s) 212. Thereafter, the emission analysis module 112 may further determine a second value of estimated emissions 214 by not considering the baseline control parameter. The emission analysis module 112 may then compare the first value and the second value of the estimated emissions 214.

At block 308, a determination may be made to ascertain whether the difference is greater than or less than a predefined threshold. If the difference between the first value and the second value is beyond a predefined threshold ('Yes' path from block 308), the baseline control parameter may be considered as a relevant contributor to the emissions (block 310). However, if the difference is less than the predefined threshold ('No' path from block 308), the baseline control parameter may be considered as not relevant for the emissions (block 312). In this manner all parameters within the control parameter(s) 212 may be assessed to determine whether any given baseline control parameter is relevant or not for the purposes of the emissions.

At block 314, the relevant baseline control parameters may be ranked. For example, the emission analysis module 112 may rank the relevant baseline control parameters based on the extent of impact that such a parameter may cause on the emissions. The estimated emissions 214 may rank the relevant baseline control parameters based on the difference between the corresponding first value and the second value, in a decreasing order. In such a case, the relevant baseline control parameters which appear higher in the ordered list may be considered as more relevant and likely to have more impact on the emissions of the vehicle, such as the system 102.

At block 316, based on the relevant control parameters, aggregate emissions for a vehicle may be determined. For example, the emission analysis module 112, on determining the extent of contribution of the relevant one or more parameters within the control parameter(s) 212, may obtain an aggregate emission value for a particular trip based on the estimated emission values for the control parameter(s) 212 found to have a greatest contribution to the vehicle emissions. Thereafter, the emission analysis module 112 may determine aggregated emission estimates based on the relevant control parameter(s) 212 and based on the extent of their contribution to the emissions.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A method for estimating parameters contributing to engine emissions, the method comprising:
    obtaining values of a plurality of control parameters from vehicle sensors;
    determining an amount of an estimated emission value corresponding to each one control parameter based on a correlation criterion, wherein the correlation criterion correlates at least one control parameter from amongst the plurality of control parameters, to a rate of engine emission by an engine;
    identifying a contribution of each of the plurality of control parameters to the correlation criteria based on an amount of change in the estimated emission value determined by inclusion of the control parameter and determined by exclusion of the control parameter; and
    calculating aggregated emission exhausted from the engine for a particular trip based on estimated emission values and the contribution of each of the control parameters;
    wherein identifying each contribution comprises:
    identifying a baseline control parameter from among the control parameters;
    determining a first value of estimated emissions by considering the baseline control parameter and each of the plurality of control parameters;
    determining a second value of estimated emissions by considering each of the plurality of control parameters and excluding the baseline control parameter; and
    based on a difference of the first value and the second value, identifying the baseline control parameter as a relevant control parameter.

2. The method as claimed in claim 1, wherein identifying each contribution further comprises:
    obtaining a set of relevant baseline control parameters; and
    ranking each of the set of baseline control parameters based on the differences of respective first values and second values.

3. The method as in claim 1, wherein the control parameters are categorized into at least one of a high-impact control parameter and low-impact control parameter based on an index of the contributions.

4. The method as in claim 1, wherein the correlation criteria are based on historical operating data associated with a plurality of engines, wherein each of the engines are of a same specification.

5. The method as in claim 1, wherein the control parameters are one of engine operational parameters, vehicle operating parameters, and driving parameters.

6. A system comprising:
    a set of sensors that measure control parameters of a vehicle, wherein the control parameters are indicative of at least one of engine operational parameters, vehicle operating parameters, and driving parameters; and
    a controller coupled to the sensors, wherein the controller is programmed to:
    determine an amount of an estimated emission value corresponding to each one control parameter based on a correlation criterion, wherein the correlation criterion correlates at least one control parameter from amongst the control parameters to a rate of engine emission by an engine;
    identify a contribution of each of the plurality of control parameters to the correlation criteria based on an amount of change in the estimated emission value determined by inclusion of the control parameter and determined by exclusion of the control parameter; and
    calculate aggregated emission exhausted from the engine for a particular trip based on estimated emission values and the contribution of each of the control parameters;
    wherein to identify each contribution comprises to:
    identify a baseline control parameter from amongst the control parameters;
    determine a first value of estimated emissions by considering the baseline control parameter and each of the plurality of control parameters;
    determine a second value of estimated emissions by considering each of the plurality of control parameters and excluding the baseline control parameter; and identify the baseline control parameter as a relevant control parameter based on a difference of the first value and the second value.

7. The system as claimed in claim 6, comprising a display, wherein the controller is further programmed to cause an indication to be rendered onto the display based on the aggregated emission.

8. The system as claimed in claim 6, wherein the control parameters are one of engine operational parameters, vehicle operating parameters, and driving parameters.

9. A nontransitory computer-readable medium comprising computer-readable instructions, which when executed by a processor, cause a computing device to:
- calculate an amount of estimated emission value corresponding to each one control parameter based on a correlation criterion, wherein the correlation criterion correlates at least one control parameter from amongst the plurality of control parameters to a rate of engine emission by an engine;
- determine a contribution of each of the control parameters to the correlation criteria based on an amount of change in the estimated emission value determined by inclusion of the control parameter and determined by exclusion of the control parameter; and
- obtain a value of an aggregated emission exhausted from the engine for a particular trip based on estimated emission values and the contribution of each of the control parameters;
- wherein to identify each contribution comprises to:
- identify a baseline control parameter from among the control parameters;
- determine a first value of estimated emissions by considering the baseline control parameter and each of the plurality of control parameters;
- determine a second value of estimated emissions by considering each of the plurality of control parameters and excluding the baseline control parameter; and
- based on a difference of the first value and the second value, identify the baseline control parameter as a relevant control parameter.

10. The nontransitory computer-readable medium of claim 9, wherein to identify each contribution further comprises to:
- obtain a set of relevant baseline control parameters; and
- rank each of the set of baseline control parameters based on the differences of respective first values and second values.

11. The nontransitory computer-readable medium of claim 9, wherein the control parameters are categorized into at least one of a high-impact control parameter and a low-impact control parameter based on an index of the contributions.

12. The nontransitory computer-readable medium of claim 9, wherein the correlation criteria are based on historical operating data associated with a plurality of engines, wherein each of the engines are of a same specification.

13. The nontransitory computer-readable medium of claim 12, wherein the specification associated with the engine is one of fuel type, injection timing, compression ratio, turbocharger efficiency, after-cooler characteristics, ideal operating temperature range, operating pressure range, operating fuel rates, and engine speed.

14. The nontransitory computer-readable medium of claim 9, wherein the control parameters are one of engine operational parameters, vehicle operating parameters, and driving parameters.

15. The nontransitory computer-readable medium of claim 14, wherein the vehicle operating parameters comprise vehicle speed, vehicle acceleration, braking force, engine speed, engine load, engine fuel consumption, intake manifold pressure, intake manifold temperature, NOx sensor reading, injection pressure, engine coolant temperature, exhaust flow rate, engine NOx output, catalyst inlet temperature, and catalyst temperature.

16. The nontransitory computer-readable medium of claim 14, wherein the driving parameters comprise accelerator pedal position, brake pedal position, number of clutch actuations, and gear shift frequency.

17. The nontransitory computer-readable medium of claim 14, wherein the engine operational parameters comprise engine temperature, exhaust flow rate, engine out-NOx, SCR related temperature, and urea dosage.

18. The system as claimed in claim 6, wherein to identify each contribution further comprises to:
- obtain a set of relevant baseline control parameters; and
- rank each of the set of baseline control parameters based on the differences of respective first values and second values.

* * * * *